United States Patent [19]

Onisawa et al.

[11] Patent Number: 5,739,877
[45] Date of Patent: Apr. 14, 1998

[54] ACTIVE MATRIX LIQUID CRYSTAL DISPLAY IN WHICH THE GATE AND/OR DRAIN LINES ARE MADE OF A CR-MO ALLOY

[75] Inventors: Kenichi Onisawa, Hitachinaka; Tsutomu Sato, Mobara; Takashi Suzuki, Mobara; Kouichi Anno, Mobara; Hideaki Yamamoto, Tokorozawa; Toshiki Kaneko, Chiba, all of Japan

[73] Assignee: Hitahci, Ltd., Tokyo, Japan

[21] Appl. No.: 555,416

[22] Filed: Nov. 9, 1995

[30] Foreign Application Priority Data

Nov. 18, 1994 [JP] Japan .................... 6-284755

[51] Int. Cl.⁶ .................... G02F 1/136; G02F 1/1343
[52] U.S. Cl. .................... 349/42; 349/46; 349/139; 349/147
[58] Field of Search .................... 359/59, 87; 349/139, 349/147, 42, 46

[56] References Cited

U.S. PATENT DOCUMENTS 5,162,933 11/1992 Kakuda et al. ............ 349/147
5,528,082 6/1996 Ho et al. ............ 257/775

*Primary Examiner*—William L. Sikes
*Assistant Examiner*—Walter Malinowski
*Attorney, Agent, or Firm*—Antonelli, Terry, Stout, & Kraus, LLP

[57] ABSTRACT

An active matrix liquid crystal display comprises a first substrate, a second substrate, and liquid crystal held therebetween. The first substrate includes on one surface, a plurality of gate lines, a plurality of drain lines crossing the gate lines, and transistors each disposed in the vicinity of crossing points between the gate lines and the drain lines. Source electrodes of the transistors are each connected to pixel electrodes each disposed in the vicinity of the source electrodes. The drain electrodes of the transistors are connected to one of a plurality of the drain lines while the gate electrodes of the transistors are connected to one of a plurality of the gate lines. The second substrate is disposed in such a manner as to face to the first substrate and to have facing electrodes on the surface facing to the pixel electrodes. In such a liquid crystal display, either a plurality of the gate lines or a plurality of the drain lines are made of a Cr alloy containing at least one kind selected from a group consisting of Mo, Nb, Ta and W.

9 Claims, 4 Drawing Sheets

ACTIVE MATRIX LIQUID CRYSTAL DISPLAY IN WHICH THE GATE AND/OR DRAIN LINES ARE MADE OF A CR-MO ALLOY

BACKGROUND OF THE INVENTION

1. Field of the Invention

The present invention relates to an active matrix liquid crystal display driven by thin film transistors (TFTs).

2. Description of the Related Art

Recently, active matrix liquid crystal displays (LCD) driven by TFTs have been required to be improved in performance-cost ratio. To meet such a requirement, it is necessary to reduce the cost of a fabricating process of a TFT-LCD using amorphous silicon (a-Si). In the fabricating process of a TFT-LCD, particularly, the number of the processing steps must be reduced, and also throughput and yield must be enhanced. From such a viewpoint, for example, Japanese Patent Laid-open No. Sho 62-32651 has proposed an active matrix liquid crystal display driven by TFTs each having a configuration in which an insulating layer has the same plane pattern as that of a semiconducting layer. Such a TFT element structure is advantageous in simplifying the fabricating process by reducing the number of the photolithographic steps from five times (the usually required number) to four times, and in preventing damage of an insulating layer for improving reliability and yield.

The above TFT element structure is effective to simplify the fabricating process; however, it is not sufficiently examined in terms of a metal material for formation of thin films used as a gate electrode and a drain electrode. Consequently, it has disadvantages that throughput is low and yield is unstable, leading to difficulties in significantly reducing the cost of the fabricating process.

SUMMARY OF THE INVENTION

An object of the present invention is to provide a TFT element structure capable of enhancing throughput and yield, and particularly to provide an improved electrode material used for a TFT element and the structure of a film made of the material.

To achieve the above objects, according to a preferred mode of the present invention, a liquid crystal display apparatus is provided which includes a pair of substrates, a liquid crystal layer interposed between the substrates, and gate lines and drain lines formed on one of said pair of substrates, wherein the gate lines and drain lines cross each other in a matrix form. Thin film transistors are formed near the intersections of the gate lines and data lines, and pixel electrodes are formed on one substrate, each connected to a corresponding thin film transistor. In accordance with the present invention, the gate lines and/or drain lines are formed by a Cr—Mo alloy, and the resistivity of the Cr—Mo alloy is lower than 20 μΩcm.

In the above liquid crystal display, a plurality of the gate lines and a plurality of the drain lines are preferably formed in such a manner as to be identical in film thickness to each other; and an end portion of each pattern of a plurality of the gate and a plurality of the drain preferably has a taper of 45° or less.

Either a plurality of the gate or a plurality of the drain lines are preferably formed of an laminated film having at least two alloy layers different in Cr content from each other. In this case, an alloy layer being lower in Cr content is preferably disposed at a higher position of the laminated film.

The function of the present invention will be described below.

In an active matrix liquid crystal display, a gate line and a drain lines are required to be small in electric resistance (resistivity) for reducing the deformation of a waveform of a signal pulse, and the drain lines is required to provided an excellent electric contact with an a-Si material and an ITO (indium-Tin Oxide material) constituting a transparent electrode. The gate lines and the drain are also must be excellent in suitability for a fabricating process. This will be described in detail below. The line material must be easily processed into a line pattern having a desired shape, and further it requires the following properties. In the fabricating process, an element substrate is exposed to various solutions such as an etching solution, photoresist developing solution, photoresist separating solution, or exposed to an etching gas. Accordingly the wiring material is required to be less susceptible to these solutions and gases. It also requires a heat-resistance so as not to be deteriorated in characteristics due to thermal history in other processing steps.

Specifically, to satisfy the above properties, it may be conceived to use Al or an Al alloy being low in resistivity as the wiring material. Such a wiring material, however, is insufficient in heat-resistance (leading to generation of hillocks) and it reacts with an a-Si semiconducting layer. A technique for coping with this problem has been proposed and put in practical use, in which a Al film is laminated to a film of a different metal such as Cr, Mo or Ta. Such a laminated structure, however, has an inconvenience in complicating the fabricating process.

A high melting point metal such as Cr, Mo, Ta or W has been examined as a material for satisfying the above requirement in the form of a single layer film. From this examination, it was revealed that Mo and W are insufficient in chemical stability and Ta is relatively high in resistivity, and consequently Cr is most suitable in the above high melting point metals. However, a Cr film formed by sputtering is high in film stress (tensile strength) and has disadvantages that in the film deposition step and in the subsequent photolithographic step, the Cr film causes inconveniences such as separation of the film itself from the underlaying film, separation of the underlaying film, and cracking on the underlaying film. Moreover, the Cr film is required to be further reduced in resistivity.

The present inventors have studied wiring material from the above-described viewpoint, and found the fact that it is effective to use, as the wiring material, a Cr alloy containing at least one kind selected from a group consisting of Mo, Nb, Ta, and W.

The gate line and a drain line are also required to be compatible with measures for reducing the fabricating cost, for example, simplifying the fabricating process. Specifically, for reducing the fabricating cost, a period from a time when a substrate is set in the system to a time when it is discharged from the system after completion of film formation or etching must be short (that is, throughput should be large) and a period of time between processing steps must be made constant (the flow of products should be made smooth). Also, materials used in the steps of film formation and etching must be inexpensive and the kinds thereof must be lessened. As described above, to meet these requirement for reducing the fabricating cost, it is effective that a gate line and a drain line are formed of a single layer film, both the lines are made of the same material, and both the lines are identical in film thickness to each other. The prior art electrode material, however, cannot simultaneously satisfy the requirements that film stress should be low, electric resistance be low, and the process suitability be high. As a result, the prior art electrode material encounters difficulties when a gate line and a drain line are made of films being identical to each other in material and in film thickness. On the contrary, the electrode material used for the liquid crystal display according to the present invention can be compatible with the above-described measures for reducing the fabricating cost.

Incidentally, in the liquid crystal display, it is important to reduce defects generated in the element. The number of point-defects in the element can be reduced by forming a taper of 45° or less at the end of a pattern of a wiring line because the coverage of a pixel electrode formed thereon can be improved. Such a taper can be formed by changing etching, for example, by suitably selecting an etching liquid. When each of a gate line and a drain line is made of a Cr alloy containing at least one kind selected form a group consisting of Mo, Nb, Ta and W, and preferably it is formed of a laminated film having a high Cr alloy layer and a low Cr alloy layer, a small taper can be easily formed thereon. This utilizes a difference in etching rate between the high Cr alloy and the low Cr alloy. For example, a tapered end structure can be easily realized for a laminated film having the following laminated structure: The laminated film is composed of a lower layer made of a high Cr alloy containing a small amount of at least one kind selected form a group consisting of Mo, Nb, Ta and W, and an upper layer made of a low Cr alloy containing a large amount of at least one kind selected form a group consisting of Mo, Nb, Ta and W.

DESCRIPTION OF THE PREFERRED EMBODIMENTS

The present invention will be more fully understood by way of the following embodiments.

Embodiment 1

Figure 1:
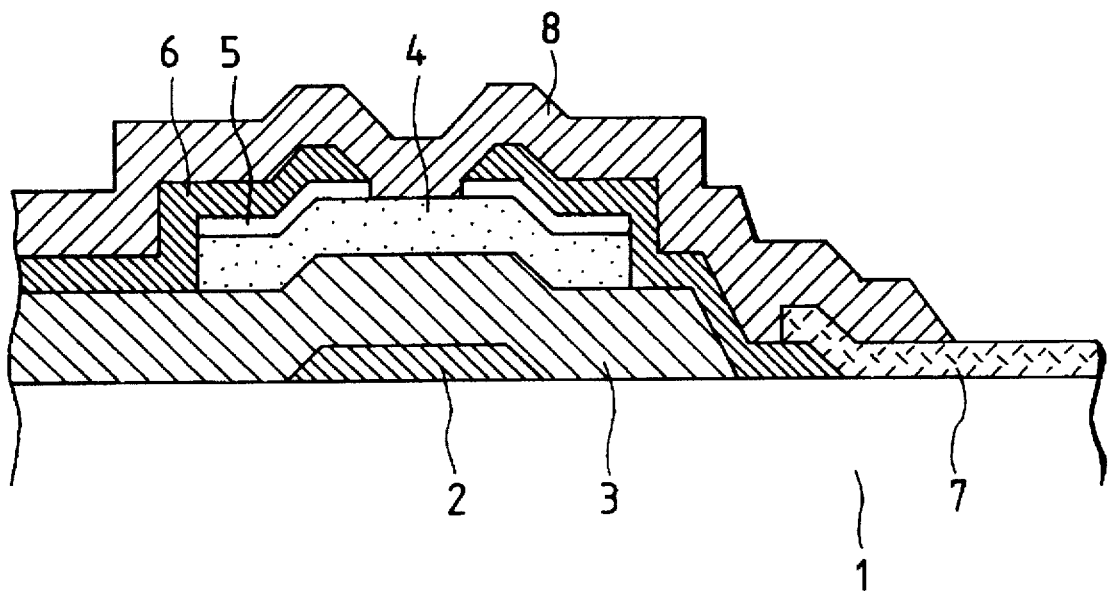
FIG. 1 is a sectional view of a TFE portion of an embodiment of a liquid crystal display according to the present invention.
Figure 2:
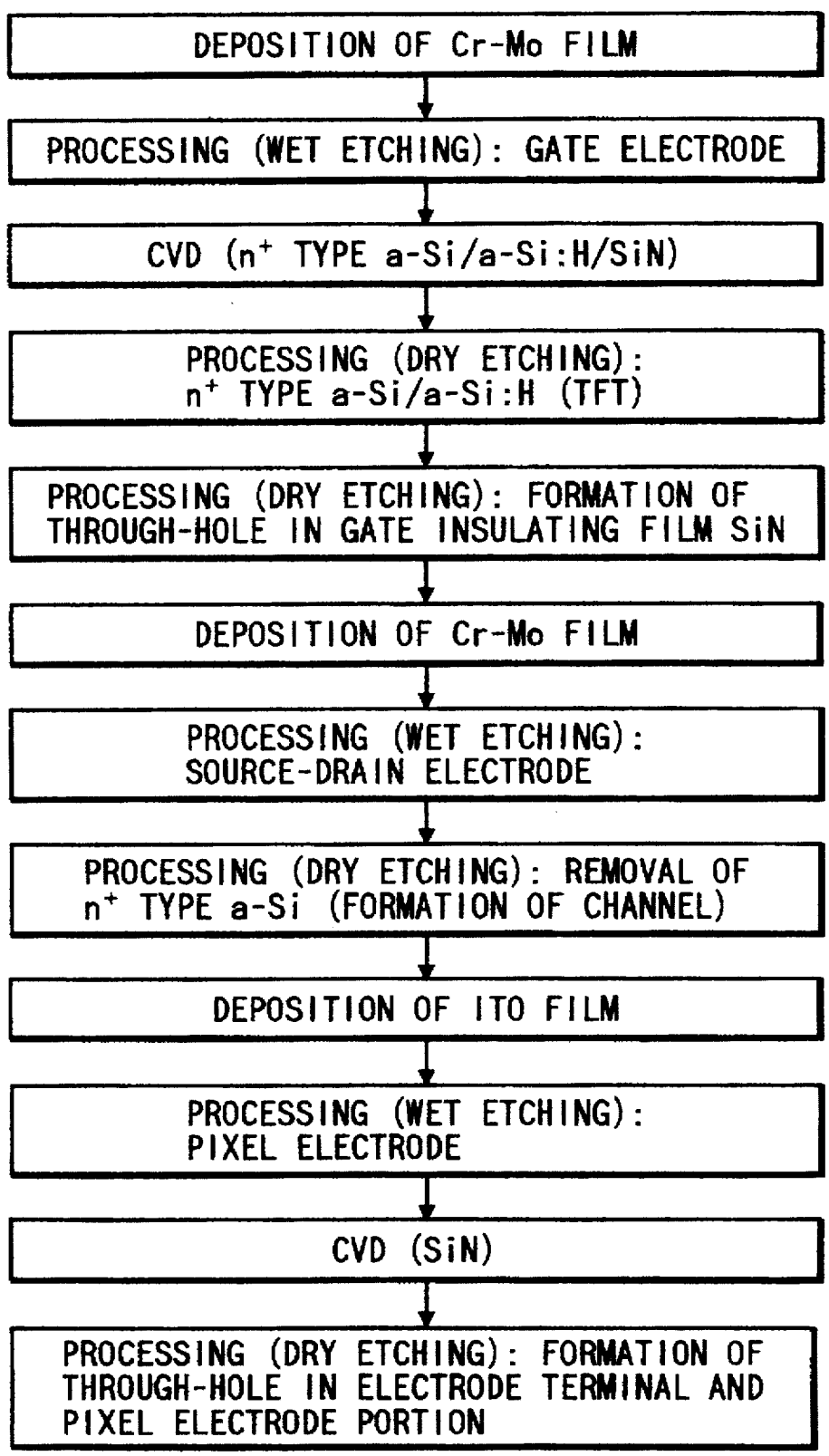
FIG. 2 is a flow-chart showing a fabricating process of a TFT substrate used for the liquid crystal display of the present invention.

FIG. 1 is a sectional view of a TFT element formed on the surface of a TFT substrate, and FIG. 2 is a flow chart of a fabrication process of the TFT substrate.

A Cr—Mo film was deposited on a glass substrate 1 to a thickness of 120 nm at a substrate temperature of 160° C. by magnetron sputtering. In this sputtering, a Cr—Mo 15%Mo alloy was used as a target. The seat resistance was 1.6μΩcm. The Cr—Mo film 2 was processed into a gate electrode 2 by photoetching. The photoetching was performed at 40° C. using as an etching solution, a cerium (IV) nitrate-aqueous ammonia solution added with $HNO_3$ in a suitable amount. A taper angle formed on gate electrode 2 can be controlled by adjustment of the added amount of $HNO_3$. The cross-section of the element was observed by SEM. As a result, the taper angle of the end portion of the gate electrode 2 was about 10°. With this taper angle, the coverage of a film laminated thereon can be improved.

Next, the substrate thus prepared was placed in an RF plasma CVD system, and an SiN layer constituting a gate insulating film 3 was formed to a thickness of 300 nm at a substrate temperature of 280° C. In this deposition, a mixed gas of $SiH_4$, $NH_3$ and $N_2$ was used as a source gas. In a different chamber of the same RF plasma CVD system, an a-Si:H film 4 (semiconducting layer) was formed to a thickness of 220 nm at a substrate temperature of 250° C. using a source gas of monosilane $SiH_4$. In a further different chamber of the same RF plasma RF CVD system, an n⁺type a-Si layer 5 highly doped with P was formed on the a-Si:H film 4 to a thickness of 50 nm at a substrate temperature of 230° C. using a mixed gas of $SiH_4$, $PH_3$ and $H_2$ as a source gas.

The n⁺type a-Si layer 5 and the semiconducting a-Si:H film 4 were patterned into a TFT shape by dry etching. Similarly, the gate insulating was then patterned by dry etching, to form through-holes for a pixel electrode and a gate electrode terminal lead-out portion. A Cr—Mo film was deposited thereon to a thickness of 120 mm using the same target and in the same chamber as used for formation of the gate electrode, at a substrate temperature of 160° C. by magnetron sputtering. Just as in forming the gate electrode, the Cr—Mo film was processed into a source-drain electrode 6 by photoetching. Subsequently, the n⁺type a-Si layer 5 was removed by dry etching, to form an TFT channel. In the actual dry etching, taking into account the processing tolerance, not only the n⁺type a-Si layer 5 was etched by 50 nm but also the semiconducting a-Si:H film 4 was over-etched by about 100 nm (not shown).

A transparent conductive ITO film was then deposited at a substrate temperature of 200° C. by magnetron sputtering, and was patterned by photo-etching, to form a pixel electrode 7. It is to be noted that while being not shown, in this step, the gate electrode 2 and the end portion of the source-drain electrode 6 (lead-out portion of the line toward the outside of the panel) around the panel were simultaneously covered with the transparent conductive ITO film. The reason for this is to ensure a reliability in connection between the panel and an external drive circuit. A SiN film constituting a protective insulating film 8 was formed thereon to a thickness of 300 nm at a substrate temperature of 250° C. by RH plasma CVD. In this deposition, a mixed gas of $SiH_4$, $NH_3$ and $N_2$ was used as a source gas. The protective insulating film (SiN) around the panel was removed by dry etching, to expose an electrode terminal and to form a though-hole in the pixel electrode portion.

In the course of the fabricating process of such a TFT substrate, inconveniences such as cracking of the substrate and film separation, which have been frequently generated, were not generated at all.

Finally, between the TFT substrate thus prepared and a facing substrate formed on an entire surface with facing electrodes, liquid crystal was enclosed, to thus complete an LCD panel. The LCD panel was then examined in terms of lighting. As a result, it was confirmed that almost no pixel defects were generated.

The n+type a-Si/a-Si:H/SiN laminated film was formed by continuous deposition using one CVD system, that is, in one processing step. The fabricating process of the TFT substrate according to the present invention thus includes the five processing steps of film deposition and the six processing steps of photolithography just as in the prior art process. However, differently from the prior art process, the process of the present invention is characterized in that the gate electrode and the source-drain electrode are made of the Cr—Mo material, and the deposition and processing of the films with respect to both the electrodes can be performed in the same processing step. With this fabricating process, it becomes possible to improve the throughput and to significantly reduce the equipment cost and maintenance cost, and hence to reduce the fabricating cost of an LCD product.

Embodiment 2

Figure 3:
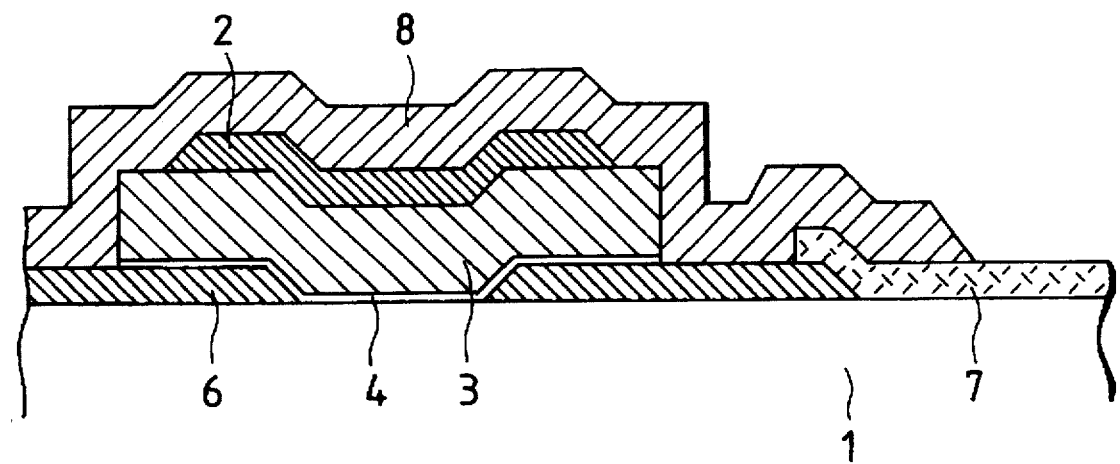
FIG. 3 is a sectional view of a TFT portion of another embodiment of the liquid crystal display according to the present invention.

FIG. 3 is a sectional view of a TFT element formed on the surface of a TFT substrate.

A Cr—Mo film was deposited on a glass substrate 1 to a thickness of 120 nm in the same manner as in Embodiment 1, that is, at a substrate temperature of 160° C. by magnetron sputtering. In this deposition, a Cr—15%Mo alloy was used as a target. The Cr—Mo film was processed into a source-drain electrode 6 by photoetching in the same manner as in Embodiment 1.

The substrate 1 thus processed was placed in an RF plasma CVD system. After $PH_3$ plasma processing for electric contact with the source-drain electrode, a semiconducting a-Si:H film 4 was deposited on the substrate 1 to a thickness of 18 nm at a substrate temperature of 250° C. by plasma CVD. In this deposition, monosilane $SiH_4$ was used as a source gas. The reason why the a-Si:H film 4 was formed to such a thin thickness is to suppress a photoelectric current which flows in the semiconducting layer and thereby increases an off-current of the transistor in the completed panel. In the same chamber of the plasma CVD system, an SiN layer constituting a gate insulating film 3 was then formed thereon to a thickness of 300 nm at the same substrate temperature as that of the active layer, that is, 250° C. In this deposition, a mixed gas of $SiH_4$, $NH_3$ and $N_2$ was used as a source gas. A Cr—Mo film constituting a gate electrode 2 was formed thereon to a thickness of 120 nm in the same manner as in formation of the source-drain electrode, that is, at a substrate temperature of 160° C. by magnetron sputtering. The Cr—Mo film was then processed into the gate electrode 2. In this processing step, slightly differently from the processing for the source-drain electrode, the Cr—Mo film was over-etched, for example by making longer an etching time. The active layer and the gate insulating film were patterned by dry etching (without separation of the photoresist). The retarded amount of the gate electrode (Cr—Mo film) relative to the pattern width of the active layer and the gate insulating film by over-etching was measured. As a result, the retarded amount of the gate electrode was about 1.5 μΩm for each side. This value is a sufficient distance necessary for preventing short-circuit between the gate electrode and the source-drain electrode.

A transparent conductive ITO film was deposited thereon at a substrate temperature of 200° C. by magnetron sputtering, and was patterned by photoetching, to form a pixel electrode 7. It is to be noted that while being not shown, the gate electrode 2 and the end portion of the source-drain electrode 6 around the panel were simultaneously covered with the transparent conductive ITO film. A SiN film constituting a protective insulating film 8 was then formed thereon to a thickness of 300 nm at a substrate temperature of 250° C. by RF plasma CVD. In this deposition, a mixed gas of $SiH_4$, $NH_3$ and $N_2$ was used as a source gas. After that, the protective insulating film (SiN) around the panel was removed by dry etching, to expose an electrode terminal and to form a through-hole in the pixel electrode portion.

In the above processing steps, inconveniences such as cracking of the substrate and separation of film, which have been frequently generated, were not generated at all. Between the FTF substrate thus prepared and a facing substrate, liquid crystal is enclosed, to complete a LCD panel. The LCD panel was examined in terms of lighting. As a result, it was confirmed that any pixel defect was little generated.

Embodiment 3

In the previous embodiments, the Cr—15%Mo alloy was used as the target. Such a target is effective to reduce both the resistivity and film stress of the film as compared with a target made of pure Cr, and therefore, it can achieve the object of the present invention. In this embodiment, the effect of the Mo content in the Cr—Mo alloy used for a target was examined.

To simply examine the effect of the composition of the Cr—Mo alloy by sputtering, there was adopted a method of placing a chip of an added metal on a pure metal target and controlling the alloy composition by changing the area ratio therebetween. Specifically, before sputtering, 5 to 30 pieces of Mo chips (size: 5×5×1 mm) were placed on a Cr target (4"φ), or 5 to 30 pieces of Cr chips (size: 5×5×1 mm) were placed on a Mo target (4"φ). The composition of a Cr—Mo alloy of a deposited thin film was precisely analyzed using inductively coupled plasma emission spectrometry. As a result, it was revealed that the chip area was nearly proportion to the composition of the Cr—Mo alloy. In this case, the sputtering condition may be set in consideration of the fact that a pure Cr target is used, the resistivity and stress of a deposited film should be minimized, and plasma can be stably kept. In this embodiment, the sputtering pressure (Ar gas pressure) was set at 1.4 mTorr, and the power was set at 500 W. The substrate temperature was selected at 130° C. in terms of mass-production such as through-put. The film thickness was set at about 120 nm. The vacuum degree was set at $2 \times 10^{-6}$ Torr or less.

Figure 4:
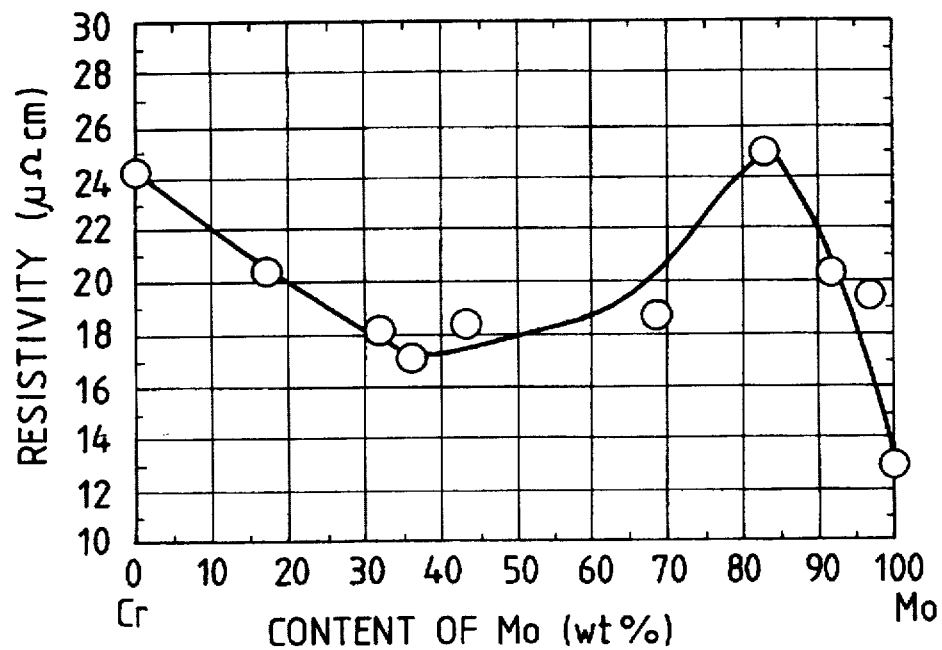
FIG. 4 is a graph showing the relationship between a composition of a Cr—Mo alloy and a resistivity of a film made of the Cr—Mo alloy.
Figure 5:
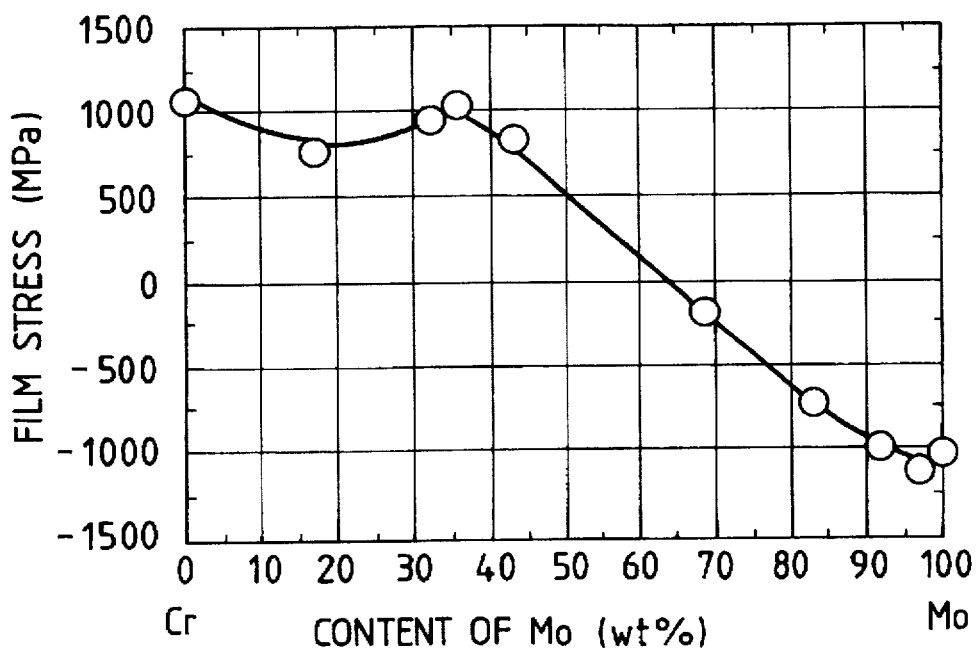
FIG. 5 is a graph showing the relationship between a composition of a Cr—Mo alloy and the stress of a film made of the Cr—Mo alloy.

FIG. 4 shows the relationship between the resistivity of the film and the Mo content in a Cr—Mo alloy. As the added amount of Mo to Cr is increased up to 35 wt %, the resistivity is lowered. In the range of 35 wt % or more, the resistivity is increased, and is maximized at about 80 wt %. In the range of about 80 wt % or more, the resistivity is lowered again. FIG. 5 shows the relationship between film stress and the Mo content in a Cr—Mo alloy. The film stress is decreased in the range to about 15 wt % of Mo, and then it is increased to about 35 wt % of Mo. At about 35%, the film stress is maximized, and is decreased in the range of about 35% or more. At about 65% of Mo, the direction of the film stress is changed from tensile stress to compressive stress, and the absolute value thereof is increased.

As is apparent from these figures, the effect can be obtained by the addition of Mo to Cr in an amount of 5 wt %. On the other hand, when the added amount of Cr to Mo is about 5 wt %, the film stress is not improved and the resistivity of the film is increased. To obtain the additional effect of Cr to Mo, the added amount of Cr is required to be more than 10 wt %. Consequently, the Mo content in a Cr—Mo alloy is preferably in the range of from 5 to 90 wt %.

It is to be noted that the film stress becomes about zero at the Mo content of about 65 wt %. Accordingly, for the Cr—Mo alloy in this embodiment, it is most suitable that the Mo content is near the above value (65 wt %), that is, in the range of 55 to 70 wt %. The smaller the film stress, the larger the film thickness. As a result, the seat resistance can be lowered, which is advantageous in terms of design of a TFT element. In particular, the reduced film stress is effective in the case where a gate lines and a drain lines are made of the same metal for simplifying the device structure.

Embodiment 4

In this embodiment, the effect of the addition of a metal element to Cr will be examined.

Nb, Ta and W were selected as the added elements, other than Mo. The reason for this is that these elements are low in electric resistance (bulk resistance: 20 μΩcm or less), being excellent in electric contact with an a-Si and ITO, and are suitable for mass-production. Each of these metals has a BCC (Body Centered Cubic) system. These elements are also readily soluble with each other. In other words, it is expected to prevent generation of unevenness in structure due to precipitation of a second phase.

Figure 6:
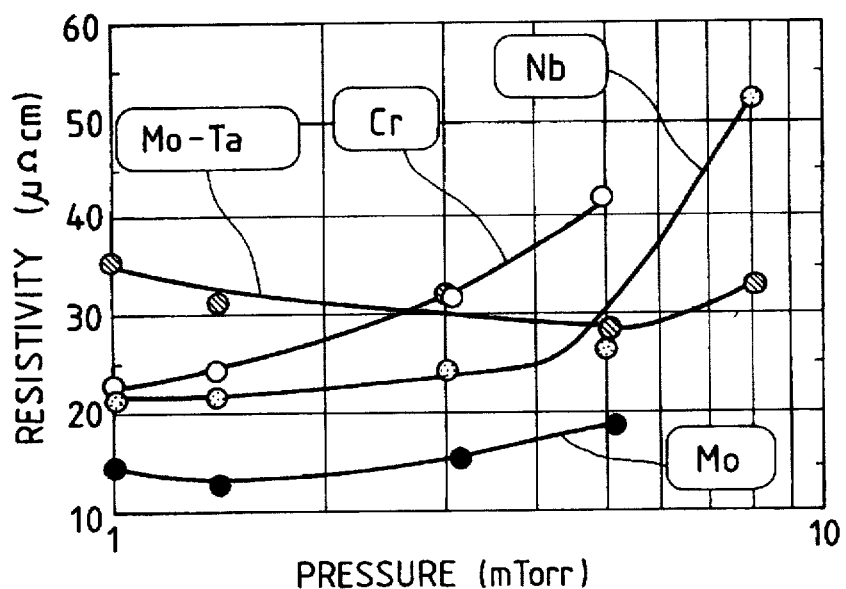
FIG. 6 is a graph showing the relationship between a resistivity of each metal and a sputtering pressure.
Figure 7:
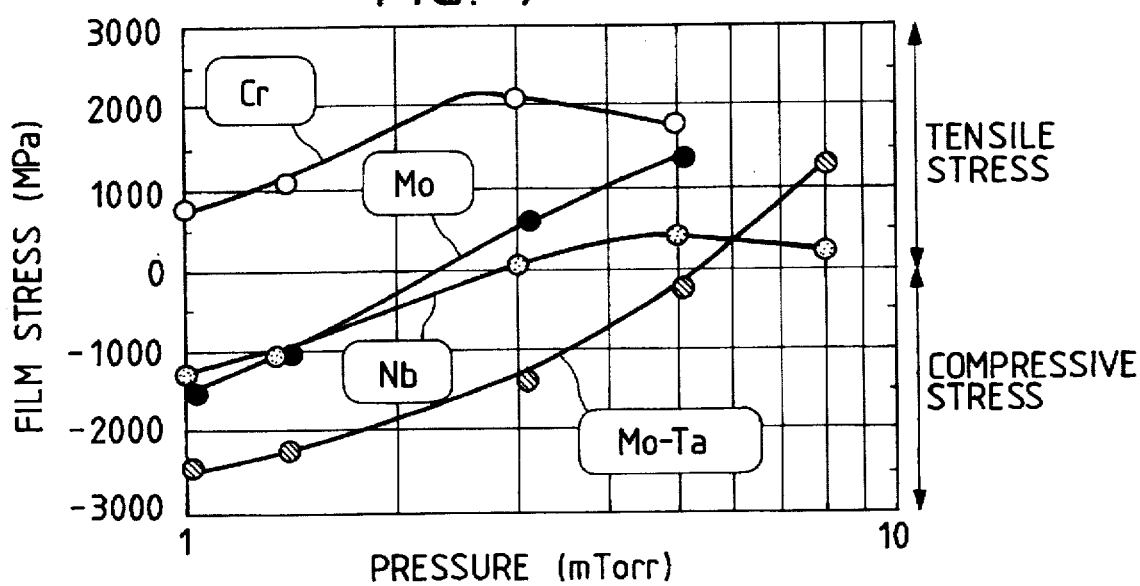
FIG. 7 is a graph showing the relationship between a film stress of each metal and a sputtering pressure.

FIGS. 6 and 7 respectively show the relationships between a sputtering pressure and a resistivity of a film and between a sputtering pressure and a film stress, with respect to Cr, Mo, Nb and a Mo—Ta alloy. The reason why the Mo—Ta alloy is used here is that the resistivity of a film made of pure Ta having a tetragonal system is very high (about 200 μΩcm) and the Mo—Ta alloy has a BCC system in which the resistivity is low. In this embodiment, the Mo content in the Mo—Ta alloy was set at 55 wt %. Referring to FIG. 6, the resistivity is increased linearly with the sputtering pressure, except for the Mo—Ta alloy. As is apparent from FIG. 7, for each of the materials, the film stress tends to be increased linearly with the sputtering pressure. However, some of them are maximized and then lowered. In the examined range, the film stress of Cr is tensile stress, and other metal elements are converted from compressive stress to tensile stress. The atomic weights of Cr, Mo, Nb and Mo—Ta alloy are 52.01, 95.95, 92.91, 121.6 (arithmetical average), respectively, and as shown in FIG. 7, the curves are shifted rightward in the order of the atomic weights, that is, in the order of Cr, Mo, Nb and Mo—Ta alloy. The reason for this is as follows. An energy of a particle which is sputtered and reaches the substrate, becomes larger as the sputtering pressure is smaller, and as an energy of a particle impinging the surface of a growing film is larger, the compressive stress of the film is larger. In the case where the atomic weight of the incoming particle becomes larger, it may be similarly considered that the incoming energy is increased and thereby the film stress is easy to become compressive stress. Referring to FIG. 7, just as in Embodiment 3, the film stress of an alloy in which Mo is added to Cr becomes about zero at the sputtering pressure of 1.4 mTorr. Specifically, by adding to Cr a metal element having a relatively large atomic weight such as Mo, the film stress of Cr can be controlled at about zero.

Embodiment 5

A Cr—35%Mo film was deposited on a glass substrate to a thickness of 100 nm at a substrate temperature of 130° C.

by magnetron sputtering. Subsequently, Cr—15%Mo film was deposited on the Cr—35%Mo film to a thickness of 20 nm in the same sputtering condition. The double Cr—Mo layer film thus obtained was processed into a gate electrode by photoetching. The photoetching was performed at 40° C. using as an etching solution a cerium (IV) nitrate-aqueous ammonia solution. In the first embodiment, the cerium (IV) nitrate-aqueous ammonia solution added with $HNO_3$ in a suitable amount was used as the etching solution; however, in this embodiment, it was revealed that a taper angle of 45° or less can be given to the end portion of the Cr—Mo gate electrode even by the use of the cerium (IV) nitrate-aqueous ammonia solution not added with $HNO_3$.

While the preferred embodiments of the present invention have been described, such description is for illustrative purposes only, and it is to be understood that changes and variations may be made without departing from the spirit or scope of the following claims.

What is claimed is:

1. A liquid crystal display apparatus comprising:
   a pair of substrates;
   a liquid crystal layer interposed between said pair of substrates;
   gate lines and drain lines formed on one of said pair of substrates, wherein said gate lines and said drain lines cross each other in a matrix form;
   thin film transistors formed near the intersections of said gate lines and said data lines; and
   pixel electrodes formed on said one substrate, each connected to a corresponding thin film transistor of said thin film transistors;
   wherein said gate lines and/or said drain lines are formed by a Cr—Mo alloy and wherein the resistivity of said Cr—Mo alloy is lower than 20 μΩcm, and
   wherein said Cr—Mo alloy contains lower than or equal to 70 wt % of Mo.

2. An active matrix liquid crystal display according to claim 1, wherein
   a plurality of said gate lines and a plurality of said drain lines are formed in such a manner as to be identical in film thickness to each other.

3. An active matrix liquid crystal display according to claim 1, wherein
   either a plurality of said gate lines or a plurality of said drain lines are formed of laminated film having at least two alloy layers different in Cr content from each other.

4. An active matrix liquid crystal display according to claim 3, wherein
   said laminated film is so constructed that an alloy layer being lower in Cr content is disposed at a higher position of said laminated film.

5. A liquid crystal display according to claim 1, wherein said Cr—Mo alloy contains higher than or equal to 10 wt % of Mo.

6. A liquid crystal display apparatus according to claim 1, wherein said gate line and said drain lines are formed by a single layer film.

7. A liquid crystal display apparatus comprising:
   a pair of substrates;
   a liquid crystal layer interposed between said pair of substrates;
   gate lines and drain lines formed on one of said pair of substrates, wherein said gate lines and said drain lines cross each other in a matrix form;
   thin film transistors formed near the intersections of said gate lines and said data lines; and pixel electrodes formed on said one substrate, each connected to a corresponding thin film transistor of said thin film transistors, wherein said gate lines and said drain lines are formed by a Cr—Mo alloy containing higher than or equal to 10 wt % of Mo and lower than or equal to 70 wt % of Mo, and wherein the resistivity of said Cr—Mo alloy is lower than 20 μΩcm.

8. A liquid crystal display apparatus according to claim 7 wherein said Cr—Mo alloy contains higher than or equal to 55 wt % of Mo.

9. A liquid crystal display according to claim 7, wherein said gate line and said drain lines are formed by a single layer film.

* * * * *